Sept. 11, 1923.
J. OKILL
1,467,558
PRESSURE INDICATOR FOR INTERNAL COMBUSTION ENGINES AND THE LIKE
Filed April 5, 1920
2 Sheets-Sheet 1
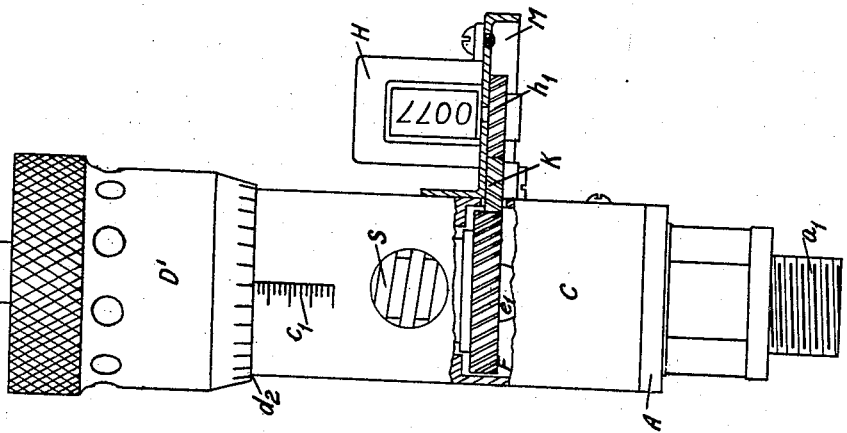
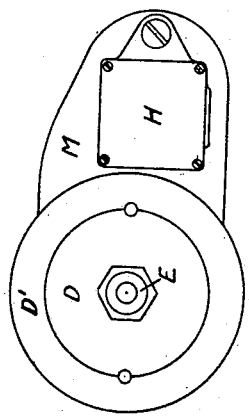
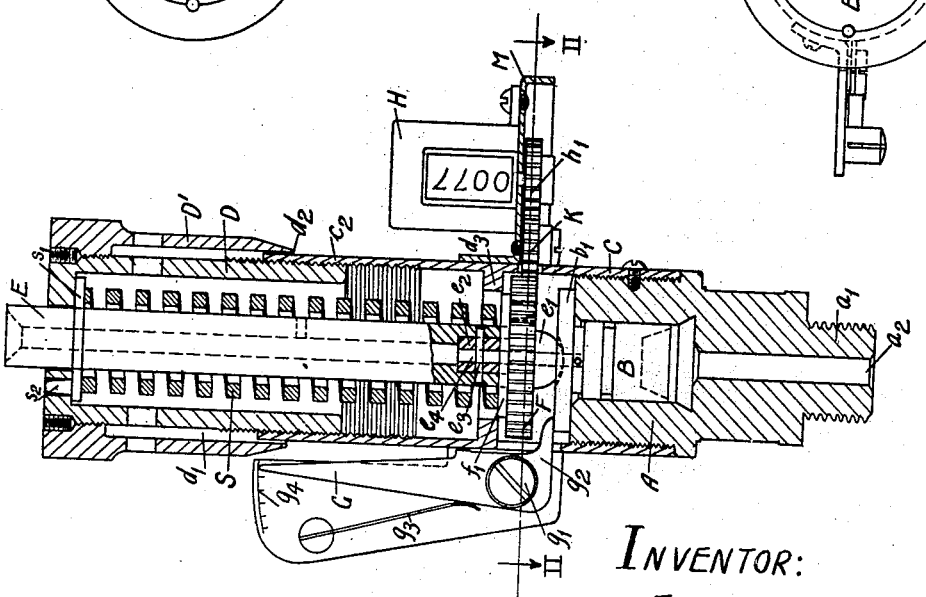
INVENTOR:
John Okill
by Spear, Middleton, Donaldson & Hall,
Atty's Sept. 11, 1923.

J. OKILL 1,467,558

PRESSURE INDICATOR FOR INTERNAL COMBUSTION ENGINES AND THE LIKE

Filed April 5, 1920      2 Sheets-Sheet 2

INVENTOR:

John Okill

Attys.

Patented Sept. 11, 1923.

1,467,558

UNITED STATES PATENT OFFICE.

JOHN OKILL, OF ROCK FERRY, ENGLAND.

PRESSURE INDICATOR FOR INTERNAL-COMBUSTION ENGINES AND THE LIKE.

Application filed April 5, 1920. Serial No. 371,473.

*To all whom it may concern:*

Be it known that I, JOHN OKILL, a subject of the King of Great Britain, and residing in Rock Ferry, in the county of Chester, England, have invented certain new and useful Improvements Relating to Pressure Indicators for Internal-Combustion Engines and the like, of which the following is a specification.

This invention relates to pressure indicators for internal combustion engines and the like, and is specially applicable to that type of such indicator described in the specification to Letters Patent No. 12158 of 1907, granted to me.

In such indicators the reading is proportional to the axial position, in relation to the main casing, of a screwed sleeve which by rotation is caused to compress a spiral spring in order to vary the force which such spring exerts on the working piston; the sleeve and the main casing form in effect a micrometer device; in known constructions of the indicator the reading is obtained by the well known micrometer method of grading the case axially and grading the circumferential edge of the sleeve circumferentially; such indications are not direct in a sense that the reading is given in plain figures, and the object of the present invention is to provide such indicators and analogous instruments with a direct reading device.

According to the invention I make use of the fact that the number of revolutions and the fraction of a revolution of the screwed sleeve from a given zero position of the sleeve in relation to the casing is a measure of the axial position of the sleeve in relation to the said zero position; I therefore fix to the casing a revolution counting device either to the screwed sleeve or to a part which rotates therewith; the ratio of the gearing being such that the numbers shown on the counter give a direct reading of the quantity which varies with the position of the sleeve.

In a pressure indicator as described in the said specification, the quantity to be measured is the pressure in lbs. per square inch on the working piston, which pressure is proportional to the axial position of the sleeve; and the ratio of the gearing is so proportioned to the compressive strength of the spring that the figures on the counter, for any given position of the sleeve, give a direct reading of the pressure in lbs. per square inch on the piston corresponding with that position of the sleeve.

The invention is illustrated in the accompanying drawings, in which Figs. 1 to 4 show the preferred form of the apparatus, and Figs. 5 and 6 show a modification.

Fig. 1 is an elevation in longitudinal medial section.

Fig. 2 is a corresponding plan in section on the line II, II of Fig. 1.

Fig. 3 is an elevation with portions omitted and a portion shown in section to illustrate a modification in the gearing.

Fig. 4 is a plan.

Figure 5:
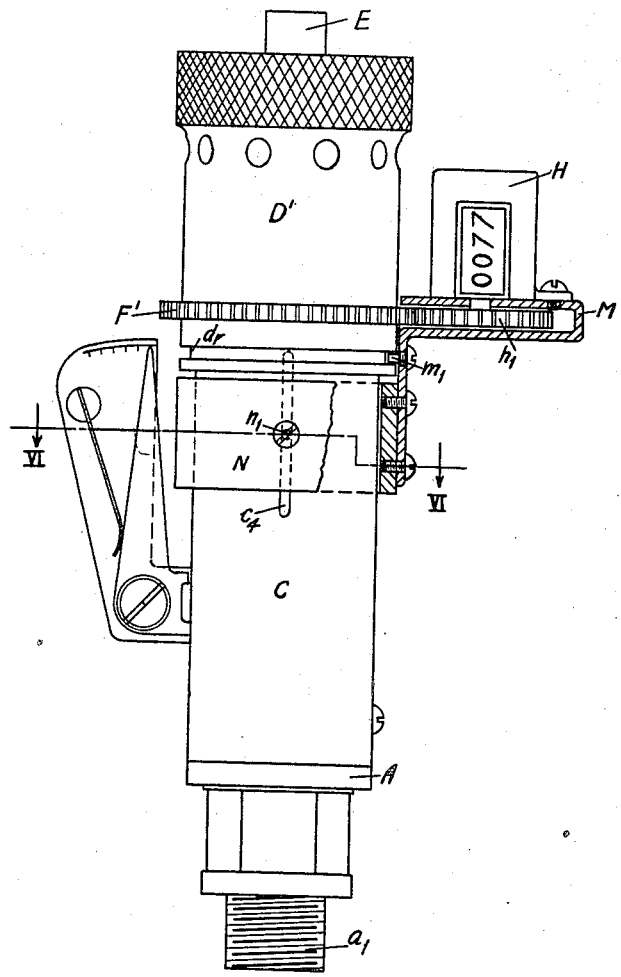
Fig. 5 is an elevation of a modification in which the bracket supporting the counting device and the means for supporting it, are shown in longitudinal section.

The instrument comprises, broadly, a small cylinder A with a screwed stem $a^1$ by which the attachment is made through a suitable screwed hole in the wall of the combustion chamber, to an indicator cock connection or other screwed connection leading to the combustion chamber through the central part $a^2$, and within the bore is located a piston B fitted with a limiting flange $b^1$. The cylinder is surrounded by a casing C the lower end of which is internally screw-threaded and is permanently secured to the cylinder A. The upper portion of the casing C is internally screw-threaded at $c^2$ and a screwed sleeve D fits the said screw thread.

The sleeve D has attached to it an external sleeve D', leaving an annular space $d^1$ between the sleeves to accommodate the casing as the combined sleeve is screwed in and out, the outer sleeve D' being graduated along the edge $d^2$ and the exterior of the casing C being provided with corresponding axial graduations $c^1$, so that by the use of these sleeves as a micrometer device it is possible to measure accurately the axial position of the sleeve D in relation to the casing C.

The hollow piston rod E is guided at its upper end by a suitable bore in the end of the sleeve D and at the lower end an abutment piecce $e^1$ is fitted to the piston rod E, which abutment piece rests in a spherical recess in the limiting flange $b^1$ of the piston B.

The abutment piece has a spigot or stem $e^2$ which fits a recess in the end of the hollow piston rod and is secured in position therein by a pin $e^3$; a spur wheel F is interposed between $e^1$ and the end of the hollow piston rod, the bore of the spur wheel fitting the stem $e^2$ and being held axially in position between the lower end of the hollow piston rod and the abutment piece $e^1$.

Within the casing D a spiral spring S is located, the upper end of which is attached to a washer $s^1$ and the lower end of which is attached to a ring $f^1$ fitting the face of the spur wheel F and having a pin connection which prevents rotation between the ring and the wheel. The washer $s^1$ is provided with a pin $s^2$ which fits in a hole in the end of the sleeve D.

It will be seen that if the sleeve D, D' be rotated, the spring is compressed and rotated and that the spur wheel F therefore rotates with the sleeve, the abutment piece $e^1$ turning in the spherical seating of the flange $b^1$.

Oil is supplied to the apparatus through the hollow piston rod E, and the abutment piece $e^1$ and its stem $e^2$ have a central port $e^4$ by which oil is conveyed to the spherical seating and to the piston. The upward movement of the abutment piece and therefore of the piston B is limited by a flange $d^3$ or in any other convenient manner.

When the downward force of the spring is less than the upward force exerted on the piston by the maximum pressure within the cylinder to be tested, the piston is oscillated by the variation of pressure in the said cylinder, which oscillation is indicated by the corresponding oscillation of the bell-crank lever pivoted at $g^1$ comprising a pointer G and a short arm $g^2$ which, by means of a spring $g^3$, is maintained in contact with the flange $b^1$ of the piston B and the long arm of which moves over a scale $g^4$.

In order to ascertain the maximum pressure, the sleeve D, D' is screwed down until the force of the spring just overcomes the maximum upward pressure on the piston; this is indicated by the cessation of the vibration of the pointer, for as soon as the force of the spring exceeds the upward pressure the piston is held down in its lower position.

The axial position of the sleeve as indicating the degree of compression of the spring when the maximum pressure in the cylinder has just been overcome, is therefore a measure of that pressure, and in order that the said pressure may be directly read in figures, the wheel F is geared to a wheel keyed on the spindle of a revolution counter H of that type, for example, used in cyclometers. The wheel F may be geared directly to the wheel $h^1$ on the counter spindle, or it may, in order to keep the diameters of the wheels small, be geared through an intermediate wheel K. The counter H is mounted on a bracket M secured to the casing C, which bracket may be adapted to enclose, or, as in the example illustrated, to protect the gear wheels.

The velocity ratio of the gearing is so arranged, for a given strength of the spring S and pitch of the screwed part of the sleeve D, that the reading of the revolution indicator may, for any given axial position of the sleeve D, correspond with the force of the spring then exerted in pounds, divided by the area of the piston in square inches, so that a maximum pressure of $105\frac{1}{2}$ lbs. per square inch would, when the necessary adjustments were made, read 105.5 on the counter; in this case the counter disc indicating decimals of a pound would make one revolution when the sleeve D was rotated an amount necessary to give an axial movement corresponding with a change in the force of the spring equivalent to one pound per square inch of piston area. The second decimal place may be indicated by the provision of another counter disc, but usually the first place suffices.

In the modification shown in Fig. 3 the teeth of the gear wheels are made helical, and as the wheels $h^1$ and K are held stationary axially, the axial movement of the wheel F due to the vibration of the piston which takes place as described until the necessary adjustment is made, causes, by virtue of the obliquity of the teeth, a corresponding angular movement of the wheel $h^1$ and the counter disc to which it is connected. This indication dispenses with the necessity for fitting the pointer G.

In the modification shown in Figs. 3 and 4, instead of transmitting the rotation of the sleeve D to the wheel F by means of the spring S as described, the piston rod E is made of polygonal cross-section and fits a corresponding hole in the end of the sleeve D and the wheel F is mounted so that it rotates with the rod E and therefore with the sleeve D.

Figure 6:
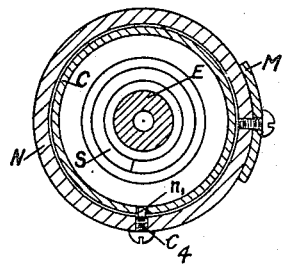
Fig. 6 is a corresponding plan in transverse section on the line VI, VI, of Fig. 5.

In the modification illustrated in Figs. 5 and 6 the wheel F' is mounted directly on the sleeve D', and as in this case it moves axially as well as angularly, the bracket M' is given axial movement equal to that of the sleeve D' and the wheel F'. This is accomplished by carrying the bracket on a sleeve N adapted to slide on the casing C but held against rotation thereon by the engagement of the end of a screw $n^1$ with an axial slot $c^4$ in the casing C. The sleeve D' has a groove $d^7$ with which a pin $m^1$ on the bracket M fits. The wheel $h^1$ in this case gears directly with the wheel F' and is maintained in transverse alignment with it by the axial movement imparted by the pin $m^1$ in the groove $d^7$.

The action is the same as that already described.

Whilst I have described the invention as applied to an indicator of the type illustrated in the said specification, it is to be understood that it is applicable generally to give direct readings in that class of gauge in which the said readings are proportional to the axial position of a screwed sleeve, and the details of construction may be varied to suit different types and sizes of gauges.

Having now fully described my invention, I declare that what I claim and desire to secure by Letters Patent is:—

1. In a gauge the combination of a casing, a sleeve screw threaded into connection therewith to have movement axially of said casing when turned, a piston at the other end of the casing, a spring exerting pressure upon the piston, the force of which is regulated by adjusting the sleeve, a gear rotated with the sleeve and a counter operated from the gear, the said piston receiving pressure from the fluid to be measured, in opposition to the spring pressure.

2. In combination, a casing a sleeve adjustable axially thereof, a piston receiving pressure of the fluid, the pressure of which is to be measured, a spring adjusted by the sleeve for exerting opposing pressure upon the piston, a gear turning with the sleeve, a counter operated by the gear and an indicator to show the axial displacement of the piston, substantially as described.

3. In combination, in a gauge, a casing, a piston therein to receive pressure from the fluid to be measured as to its pressure, a spring bearing on the piston in opposition to the fluid pressure, a member having a screw threaded connection with the casing and when adjusted by turning it altering the pressure of said spring upon the piston, registering means including a revolvable part, and means for transmitting the rotary movement of the said member to said registering means, substantially as described.

4. In a gauge, the combination of a casing, a sleeve threaded to the casing and having movement axially of said casing, a piston reciprocable at the end of said casing, a spring exerting pressure on said piston and secured to said sleeve, the tension thereof being adjustable by rotation of said sleeve, said spring also rotating with said sleeve, and an intermediate member interposed between said piston and one end of said spring.

5. The device of claim 4, said intermediate member carrying a spur gear, and means to insure movement of the gear with the intermediate member.

In witness whereof I set my hand in presence of witnesses.

JOHN OKILL.

Witnesses:
J. E. LLOYD BARNES,
JOSEPH E. HIRST.